L. C. & B. H. THOEMING & E. A. ANDERSON.
DIRIGIBLE HEADLIGHT.
APPLICATION FILED MAY 7, 1912.
1,041,902.
Patented Oct. 22, 1912.
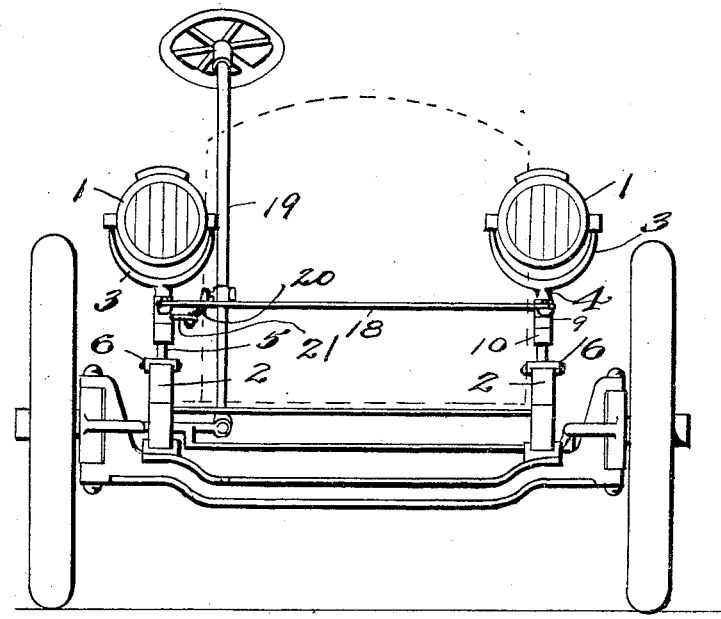
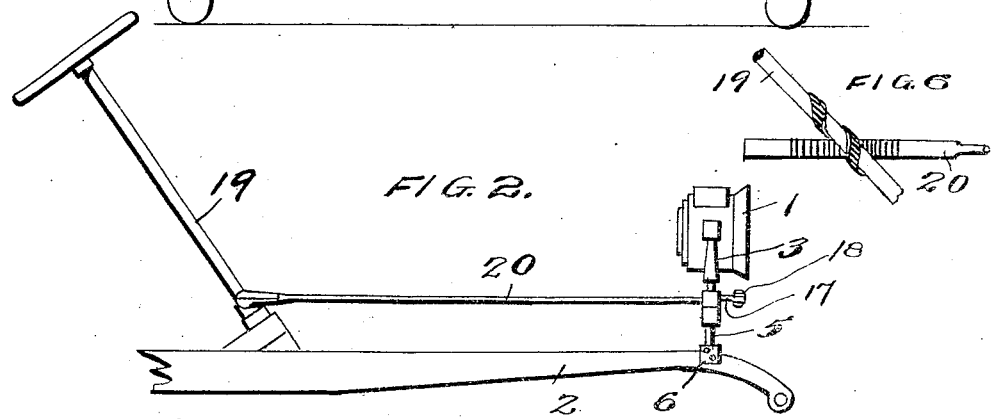
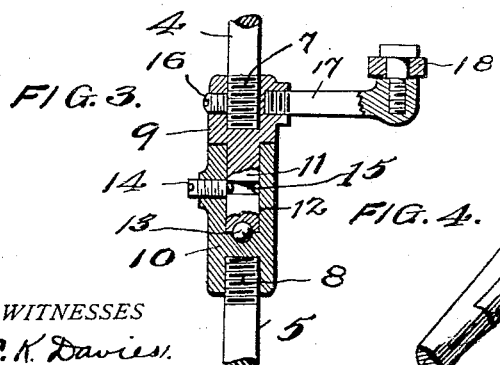
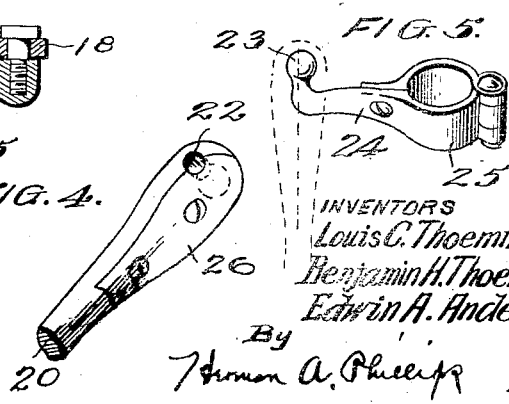
WITNESSES
C. K. Davies
Wm Nietrich
INVENTORS
Louis C. Thoeming,
Benjamin H. Thoeming,
Edwin A. Anderson,
By Herman A. Phillips
Attorney

UNITED STATES PATENT OFFICE.

LOUIS C. THOEMING, BENJAMIN H. THOEMING, AND EDWIN A. ANDERSON, OF NEWCASTLE, WYOMING.

DIRIGIBLE HEADLIGHT.

1,041,902.

Specification of Letters Patent. Patented Oct. 22, 1912.

Application filed May 7, 1912. Serial No. 695,715.

*To all whom it may concern:*

Be it known that we, LOUIS C. THOEMING, BENJAMIN H. THOEMING, and EDWIN A. ANDERSON, citizens of the United States, residing at Newcastle, in the county of Weston and State of Wyoming, have invented certain new and useful Improvements in Dirigible Headlights, of which the following is a specification.

Our invention relates to improvements in dirigible headlights and is designed especially for use in connection with auto-vehicles.

The primary object of the invention is the provision of mechanism, actuated from the steering mechanism of an auto-vehicle, by means of which the head-lights of the vehicle are caused to continually shine in the direction of travel of the moving vehicle, in order to light the way.

A further object is the provision of mechanism which is simple in construction and operation, that may be applied with facility, and will prove durable and efficient in service.

In the accompanying drawings we have illustrated one example of the physical embodiment of our invention constructed according to the best mode we have so far devised for the practical application of the principles, and which has proven highly satisfactory in actual use.

Figure 1 illustrates so much of an automobile, with our invention applied thereto, as is necessary to a clear understanding of its construction. Fig. 2 is a view of the head-light moving mechanism, and a portion of an automobile frame. Fig. 3 is a sectional view showing the standard of one of the lamp brackets. Fig. 4 is an enlarged detail of a connecting rod end, and Fig. 5 is a detail view of a clamp sleeve attached to the steering post of the vehicle. Fig. 6 shows a modified form of connection between the steering post and draw bar.

In the preferred embodiment as exemplified in the drawings, the headlights 1, 1, are directly supported from the frame 2, by means of the usual forked brackets 3, and their standards, which, as clearly seen in Fig. 3, comprise two sections 4 and 5. The lower section 5 of the standards is provided with a foot 6 which is attached, by screws, bolts or other means, to the frame 2. These standard sections 4, and 5 may be made of special design for new cars, or the standards of an old bracket may be separated into two parts and threaded, as at 7 and 8. Between the threaded ends 7 and 8 of the sections are interposed two coupling members 9 and 10, the former being rotatable in the latter. The coupling member 9 is provided with a stem 11 which projects into the socket 12 of the member 10, and an antifriction ball 13 is interposed between the parts for a bearing. A set screw 14 which engages the annular groove 15 on the stem 11 prevents withdrawal of the stem from its socket, and a set screw 16 prevents disconnection of the section 4 from the rotatable head 9. The coupling members 9 and 10 are duplicated, one at each side of the car, and each head 9 is provided with a threaded arm 17, the arms being in turn pivotally connected by the cross rod 18. From this construction it will be understood that the two lamps or headlights are swiveled, and connected to rotate synchronously each upon its anti-friction ball bearing 13.

To accomplish the synchronous movement of the lamps, the rotatable head 9 is connected to a movable or moving part of the car equipment, and as herein exemplified the steering post 19 is utilized for this purpose. The post and head 9 are connected by a rod 20, through the medium of an arm 21 projecting from the head 9 at right angles to the arm 17. To transfer the rotary movement of the steering post to a reciprocatory movement of the rod 20 we provide a swivel joint between these parts, and to this end the rod 20 is formed with a socket 22 to receive the ball 23 of the bracket 24 which latter is an extension of the clamp sleeve 25. The sleeve 25 is clamped in adjusted position on the steering post 19, and the joint may be made by removal and replacement of the socket plate 26 as will be readily understood.

The operation of the mechanism is evident and an extended description is believed to be unnecessary, except to say that the rotary movement of the steering post is transferred by reciprocatory motion of the rod 20 to synchronously swing the head lights through their connecting bar 18.

The construction shown in Fig. 6 is a modified form of actuating the draw bar or rod from the steering post to the head lights.

Having thus fully described our invention what we claim as new and desire to secure by Letters Patent is:—

In a dirigible head light mechanism, the combination of a standard having a section formed with a socket and fixed upon a post, a second section having a complementary stem rotatable in the socket, an anti-friction ball between said members, an annular groove in the stem, and a screw engaging said groove to hold the two sections against separation.

In testimony whereof we affix our signatures in presence of two witnesses.

LOUIS C. THOEMING.
BENJAMIN H. THOEMIUG.
EDWIN A. ANDERSON.

Witnesses:
W. H. COLES,
CHAS. BUTLER.

---

Copies of this patent may be obtained for five cents each, by addressing the "Commissioner of Patents, Washington, D. C."